United States Patent [19]

Drent

[11] Patent Number: 4,874,736
[45] Date of Patent: Oct. 17, 1989

[54] CATALYST COMPOSITIONS AND PROCESSES FOR POLYMERIZING CARBON MONOXIDE AND OLEFINICALLY UNSATURATED HYDROCARBONS

[75] Inventor: Eit Drent, CM Amsterdam, Netherlands

[73] Assignee: Shell Oil Company, Houston, Tex.

[21] Appl. No.: 248,067

[22] Filed: Sep. 23, 1988

Related U.S. Application Data

[62] Division of Ser. No. 940,876, Dec. 10, 1986, Pat. No. 4,788,279.

[30] Foreign Application Priority Data

Dec. 10, 1985 [NL] Netherlands .......................... 8503395

[51] Int. Cl.$^4$ ............................ C08F 4/10; C08F 4/20; C08F 4/22; C08F 4/26
[52] U.S. Cl. ..................................... 502/165; 502/167
[58] Field of Search ................................ 502/165, 167

[56] References Cited

U.S. PATENT DOCUMENTS

| | | | |
|---|---|---|---|
| 2,495,285 | 1/1950 | Hoehn | 260/28.5 |
| 2,495,286 | 1/1950 | Brubaker | 260/63 |
| 2,577,208 | 12/1951 | Ludwigshafen et al. | 260/406 |
| 2,641,590 | 6/1953 | Little, Jr. | 260/63 |
| 3,448,140 | 6/1969 | Gamlen et al. | 260/471 |
| 3,689,460 | 9/1972 | Nozaki | 260/63 |
| 3,694,412 | 9/1972 | Nozaki | 260/63 |
| 3,780,140 | 12/1973 | Hammer | 525/185 |
| 3,835,123 | 9/1974 | Nozaki | 260/94.9 |
| 3,914,391 | 10/1975 | Nozaki | 423/364 |
| 3,984,388 | 10/1976 | Shryne | 260/63 |
| 4,070,532 | 1/1978 | Hammer | 526/11.2 |
| 4,076,911 | 2/1978 | Fenton | 526/11.1 |
| 4,424,317 | 1/1984 | Serres | 525/539 |
| 4,474,978 | 10/1984 | Drent | 560/24 |

FOREIGN PATENT DOCUMENTS

| | | |
|---|---|---|
| 834073 | 2/1970 | Canada . |
| 019483 | 11/1980 | European Pat. Off. . |
| 121965 | 10/1984 | European Pat. Off. . |
| 74048406 | 12/1974 | Japan . |
| 1081304 | 8/1967 | United Kingdom . |
| 2058074 | 4/1981 | United Kingdom . |

OTHER PUBLICATIONS

Kirk-Othmer Encyclopedia of Chemical Technology, Second Edition, vol. 12, p. 132, 1967.
Encyclopedia of Polymer Science and Technology, 1968, vol. 9, 397–402.
J. Am. Chem. Soc. 1982, 104, 3520–3522.
Organometallics 1984, 3, 866–870.
Proc. Ind. Assoc. Cult. Sci. 1985, 68B, 1–5.
CHEMTECH 1986, 1, 48–51.
Adv. Polym. Sci. 1986, 73–74, 125–144.
Polym. Lett. 1965, 3, 703–707.
Chim. Inc. 1971, 53, 939–940.
J. Mol. Catal. 1983, 18, 117–125.
J. Organomet Chem. 1985, 279, C5–C10.

*Primary Examiner*—Patrick P. Garvin
*Attorney, Agent, or Firm*—Dean F. Vance

[57] ABSTRACT

The invention relates to compositions that may be used as catalysts for the preparation of polymers of carbon monoxide and olefinically unsaturated hydrocarbons. The invention also relates to processes using the catalyst compositions of the invention to prepare said polymers. The processes comprise contacting the monomers in the presence of a catalyst obtained from the reaction of a Group VIII metal compound with a nitrogen bidentate ligand, an anion of a non-hydrohalogenic acid having a pKa of less than 6, and an organic oxidant.

11 Claims, No Drawings

CATALYST COMPOSITIONS AND PROCESSES FOR POLYMERIZING CARBON MONOXIDE AND OLEFINICALLY UNSATURATED HYDROCARBONS

This is a division, of application Ser. No. 940,876 filed Dec. 10, 1986, now Pat. No. 4,788,279.

FIELD OF THE INVENTION

The invention relates to processes for the preparation of polymers of carbon monoxide and at least one alkenically unsaturated hydrocarbon. The invention also relates to the catalyst compositions used in the processes of the invention to prepare said polymers.

BACKGROUND OF THE INVENTION

Polymers of carbon monoxide and olefins, such as ethylene, have been known and available in limited quantities for many years. For example polyketones are disclosed in Kirk-Othmer Encyclopedia of Chemical Technology, Second Edition, Vol. 12, p. 132, 1967, and in Encyclopedia of Polymer Science and Technology, 1968, Vol. 9, 397-402. Kirk-Othmer Encyclopedia of Chemical Technology notes that utilities for polyketones include the use of polyketones alone or as additives in waxes and surface coating applications. The low molecular weight copolymers in particular may be used as intermediates for the production of plastics, as components in blends with other polymers (such as waxes and greases) and as pour-point depressants for middle distillate petroleum fuel products. See, for example, U.S. Pat. Nos. 2,495,285, 2,577,208 and 2,641,590 and Canadian Pat. No. 834073, which disclose utility and use for low molecular weight polyketones. The higher molecular weight polymers have use and utility as disclosed in U.S. Pat. Nos. 2,495,286 and 4,076,911 as premium thermoplastics for fibers, films, injection molding, compressing molding or blowing applications.

It is known that polyketones may be prepared by contacting CO and ethylene monomers in the presence of a catalyst. High molecular weight polymers of ethylene which contain small quantities of carbon monoxide can be prepared with the aid of Ziegler catalysts. Low molecular weight polymers of carbon monoxide with ethylene and possibly other olefinically unsaturated hydrocarbons in which all monomer units occur distributed at random within the polymer can be prepared with the aid of radical catalysts such as peroxides. A special class of the polymers of carbon monoxide with ethylene is formed by the high molecular weight linear polymers in which the monomer units occur in alternating order and which polymer consist of units with the formula —CO—(C$_2$H$_4$)—. Such polymers can be prepared with the aid of, among others, phosphorus-, arsenic-, antimony-, or cyanogen-containing compounds of palladium, cobalt or nickel as catalysts.

High molecular weight linear polymers of carbon monoxide and ethylene in which monomer units occur in alternating order and which polymers consist of units of the formula

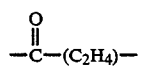

can be prepared by using Group VIII metal organic phosphine compounds as a catalyst, such as palladium organic phosphine compounds. For example, U.K. Pat. No. 1,081,304, U.S. Pat. No. 3,689,460, and U.S. Pat. No. 3,694,412 disclose processes using palladium catalysts having monodentate alkyl phosphine ligands. Similar palladium catalysts having monodentate phosphine ligands are disclosed in the articles found in *J. Am. Chem. Soc.* 1982, 104, 3520-2, *Organometallics* 1984, 3, 866-70, *Proc. Ind. Assoc. Cult. Sci.* 1985, 68B, 1-5 and *CHEMTECH* 1986, 1, 48-51. European patent application 121,965 discloses a process for polymerizing CO and alkenically unsaturated hydrocarbon using a Group VIII metal complex having bidentate phosphorous, arsenic or antimony ligands. Application of these catalysts to a monomer mixture which, in addition to carbon monoxide and ethylene, comprises at least one olefinically unsaturated hydrocarbon having the general formula C$_x$H$_y$, which hydrocarbon has fewer than 20 carbon atoms and contains an olefinically unsaturated —CH=CH— group, leads to the formation of polymers with units of the formula

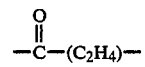

and units of the general formula

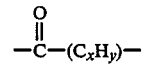

occurring randomly distributed within the polymer. The structure of the copolymers and "terpolymers" differs only in that in case of the "terpolymers" a unit of

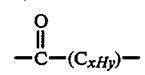

is encountered at some random places in the polymer instead of a unit of

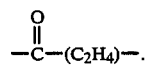

These polymers have excellent mechanical properties; especially, very high strength stiffness and impact resistance. However, the use of the Group VIII metal organic phosphine compounds as catalysts has the drawback that they are highly susceptible to oxidation. In the presence of air they are converted into phosphine oxides, which do not possess catalytic activity. Since generally the organic palladium phosphine compounds are very active catalysts, only small amounts are needed to carry out the polymerization. As a consequence, even traces of air will be sufficient for these catalysts to become deactivated. Therefore, complete freedom from air contact should be ensured during transport, storage and use of these catalysts.

SUMMARY OF THE INVENTION

Recently, new catalysts have been found which can be used, just as the above-mentioned organic palladium phosphine compounds, to prepare high molecular weight linear alternating polymers from mixtures of carbon monoxide with at least one olefinically unsaturated compound, but which catalysts are more resistant to oxidation than the phosphine compounds. The present patent application therefore relates to novel catalyst compositions which retain catalyst activity intact in the presence of air and which catalyst compositions comprise (1) a compound of a Group VIII metal selected from the group consisting of palladium, cobalt and nickel,
(2) an anion of a non-hydrohalogenic acid having a pKa less than 6,
(3) a nitrogen bidentate ligand of the general formula

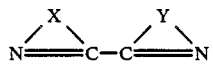

wherein X and Y represent the same or different organic bridging groups, each bridging group having three or four atoms in the bridge wherein at least two atoms of each bridge are carbon atoms, and
(4) an organic oxidant.

The patent application further relates to the use of these catalyst compositions in a process for the preparation of polymers of carbon monoxide with one or more olefinically unsaturated organic compounds as well as to polymers thus prepared and shaped objects consisting at least partly of said polymers.

DETAILED DESCRIPTION OF THE INVENTION

The preferred Group VIII metal compound present in the catalyst composition is a palladium compound. Very suitable are palladium salts of carboxylic acids and in particular palladium acetate. Examples of suitable acids with pKa of less than 6 (determined in aqueous solution at 18° C.) are sulfuric acid, perchloric acid, sulfonic acids, such as methanesulfonic acid, trifluoromethanesulfonic acid and para-toluenesulfonic acid and carboxylic acids, such as trichloroacetic acid, difluoroacetic acid and trifluoroacetic acid. Preferred are all acids with pKa of less than 4, acids with a pKa of less than 2 are even more preferred. The most preference is given to para-toluenesulfonic acid and trifluoroacetic acid. The preferred quantity of the anion of the acid with a pKa of less than 6 present in the catalyst composition is from 0.5 to 200 and more preferred from 1.0 to 100 equivalents per gram of Group VIII metal.

The acid anion component present in the compositions can occur therein either in the form of an acid or in the form of a metal salt. Suitable metal salts are selected from the group consisting of Ni, Cu, Fe, Co, Cr, Mn and V salts. Preference is given to Ni, Cu, Fe and V salts. The Group VIII metal compound of the catalyst composition and the anion of a non-hydrohalogenic acid having a pKa less than 6 may occur combined in a single compound. This is the case, for example, when a palladium compound is used that is a palladium salt of a non-hydrohalogenic acid having a pKa less than 6.

Preferably, the nitrogen bidentate ligand used as component 3 is present in the catalyst compositions in a quantity of 0.5-200, and more preferably 1-50, mol per mol of Group VIII metal compound. In the nitrogen bidentate ligand the bridging groups X and Y are linked by the two carbon atoms shown in the general formula. In addition to this bond the bridging groups X and Y can be linked by a further bond, such as in 1,10-phenanthroline and compounds derived therefrom. If, in addition to the carbon atoms, the bridging groups X and Y contain further atoms in the bridge, these atoms are preferably nitrogen atoms. Further, preference is given to nitrogen bidentate ligands wherein the bridging groups X and Y are the same group. Examples of suitable nitrogen bidentate ligands are 2,2'-bipyridine and compounds derived therefrom, such as
4,4'-dimethyl-2,2'-bipyridine,
4,4'-dichloro-2,2'-bipyridine,
4,4'-dimethoxy-2,2'-bipyridine and
4,4'-dicarboxy-2,2'-bipyridine.

Further examples of suitable nitrogen bidentate ligands that may be mentioned are 1,10-phenanthroline and compounds derived therefrom, such as
5-chloro-1,10-phenanthroline,
4,7-diphenyl-1,10-phenanthroline,
4,7-dimethyl-1,10-phenanthroline,
2,9-dichloro-1,10-phenanthroline,
1,10-phenanthroline-5-sulfonic acid and
4,7-diphenyl-1,10-phenanthrolinedisulfonic acids.

Examples of other suitable nitrogen bidentate ligands are
2,2'-diquinoline,
2-(2-pyridyl)benzimidazole,
3-(2-pyridyl)-5,6-diphenyl-1,2,4-triazine and the monosodium salt of
3-(2-pyridyl)-5,6-diphenyl-1,2,4-triazine-p,p'-disulfonic acid.

Preferably, the nitrogen bidentate ligand present in the catalyst composition is a 2,2'-bipyridine which may be substituted or a 1,10-phenanthroline which also may be substituted. Special preference is given to the compounds 2,2'-bipyridine and 1,10-phenanthroline.

In the catalyst compositions the organic oxidant used as component 4 is preferably present in a quantity of 1–10000 and more preferably 10–5000, mol per gram atom of Group VIII metal.

Examples of suitable organic oxidants are 1,4-benzoquinone and compounds derived therefrom, such as
2,6-dichloro-1,4-benzoquinone,
tetrachloro-1,4-benzoquinone,
2,3-dimethyl-1,4-benzoquinone,
2,6-dimethyl-1,4-benzoquinone,
monomethyl-1,4-benzoquinone,
trichloro-1,4-benzoquinone,
2,5-dihydroxy-1,4-benzoquinone,
2,5-dihydroxy-3,6-dinitro-1,4-benzoquinone, and
mononitro-1,4-benzoquinone.

Examples of further suitable organic oxidants are aliphatic nitrites, such as methyl nitrite, ethyl nitrite, propyl nitrite and butyl nitrite, aromatic nitro compounds, such as nitrobenzene, nitrotoluene and nitrochlorobenzene, and peroxides, such as di-tert-butyl peroxide and dicumyl peroxide. Preferably, the organic oxidant present in the catalyst compositions is a 1,4-benzoquinone which may be substituted.

The catalyst compositions according to the invention which comprise an organic oxidant can be used to prepare alternating polymers of carbon monoxide with olefinically unsaturated organic compounds, which cannot be prepared with the aid of the catalyst compositions absent the organic oxidant. Examples of such olefinically unsaturated organic compounds are styrene and compounds derived therefrom, norbornene, norbornadiene, dicyclopentadiene. Compounds that were prepared by using the catalyst compositions according to the invention, are, inter alia,
(1) linear copolymers of carbon monoxide and styrene,
(2) linear terpolymers of carbon monoxide, styrene and an α-olefin, such as ethylene or 1-hexene, (3) linear terpolymers of carbon monoxide, styrene and an alkyl-substituted styrene, such as para-ethylstyrene,
(4) linear copolymers of carbon monoxide and dicyclopentadiene, and
(5) cross-linked copolymers of said carbon monoxide and norbornadiene.

The catalyst compositions according to the invention may be used for preparing polymers of carbon monoxide and an olefinically unsaturated hydrocarbon. Most preferably, the olefinically unsaturated hydrocarbon is ethylene. The catalyst compositions may be used as well for preparing polymers of carbon monoxide with ethylene and, in addition, at least one olefinically unsaturated hydrocarbon. The latter olefinically unsaturated hydrocarbons preferably have the general formula $CHR_1=CHR_2$ wherein the groups $R_1$ and $R_2$ together contain fewer than 18 carbon atoms and wherein $R_1$ is a hydrocarbon group and $R_2$ is selected from the group consisting of hydrogen and a hydrogen group. $R_1$ and $R_2$ may together form part of a cyclic structure, as in the monomers cyclopentene and cyclohexene. Insofar as the groups $R_1$ and $R_2$ are hydrocarbon groups, preference is given to alkyl groups. Especially preferred are monomers in which $R_1$ is hydrogen and $R_2$ is an alkyl group and even more preferred $R_2$ is a methyl group.

Eligible olefinically unsaturated organic compounds which can be polymerized with carbon monoxide with the aid of the catalyst compositions according to the invention include both compounds consisting exclusively of carbon and hydrogen, and compounds which, in addition to carbon and hydrogen, comprise one or more hetero-atoms. Examples of the latter compounds are p-chlorostyrene, p-methoxystyrene and p-carboxystyrene. The catalyst compositions of the invention are preferably used in the preparation of polymers of carbon monoxide with one or more olefinically unsaturated hydrocarbons. Examples of suitable hydrocarbon monomers are ethylene and other α-olefins, such as propylene, 1-butene, 1-hexene and 1-octene, styrene and alkyl-substituted styrenes, such as p-methylstyrene and p-ethylstyrene, norbornene and dicyclopentadiene. Polymerization of one or more of these monomers with carbon monoxide leads to the formation of linear alternating polymers. When olefinically unsaturated compounds containing more than one reactive olefinically unsaturated bonds, such as norbornadiene and p-divinylbenzene, are used, this will lead to the formation of cross-linked polymers. The catalyst compositions according to the invention can also be very suitably used in the preparation of copolymers of carbon monoxide with norbornene.

The activity of these catalyst compositions for the polymerization of carbon monoxide with an olefinically unsaturated hydrocarbon is much enhanced by the inclusion of an organic oxidant into the compositions. The increase in activity will become larger accordingly as more organic oxidant is included in the composition. The inclusion of an organic oxidant in the catalyst compositions does not only enhance their activity for the polymerization of carbon monoxide with olefinically unsaturated compounds; the presence of an organic oxidant in the catalyst compositions also has an influence on the nature of the terminal groups of the prepared polymers. The polymerization of carbon monoxide with an olefinically unsaturated compound, such as ethylene, in a lower alcohol, such as methanol, as a diluent when using a catalyst composition comprising components 1-3 above, absent an organic oxidant, leads to the formation of polymers which can be represented substantially by the following formula: $CH_3-CH_2-CO-(C_2H_4-CO)_n-CH_2-CH_2-CO-O-CH_3$, i.e. polymers whose molecules bear a keto group at one end and an ester group at the other. However, the use of a catalyst composition according to the invention comprising components 1-4, leads to the formation of polymers which can be represented substantially by the formula: $CH_3-O-CO-(C_2H_4CO)_n-CH_2-CH_2-CO-O-CH_3$, i.e. polymers whose molecules bear ester groups at both ends.

The polymerization using the catalyst compositions according to the invention is preferably carried out in a liquid diluent. Very suitable liquid diluents are lower alcohols, such as methanol and ethanol. The quantities of catalyst composition used in the preparation of the polymers may vary within wide limits. Per mol of olefinically unsaturated hydrocarbon to be polymerized, a quantity of catalyst composition is used which preferably contains $10^{-7}-10^3$ and more preferably $10^{-6}-10^4$ gram atom of Group VIII metal. The preparation of the polymers by using the catalyst compositions according to the invention is preferably carried out at a temperature of 20°–200° C. and a pressure of 20–100 bar. In the mixture to be polymerized the molar ratio of the olefinically unsaturated hydrocarbons relative to carbon monoxide is preferably 10:1–1:5 and more preferably 5:1–1:2. In another embodiment of the process of the invention the temperature may be from about 30° to about 150° C. and the pressure from about 20 to about 100 bar.

Polymerization processes using the present catalyst compositions are preferably carried out in the presence of an oxygen-containing gas. Comparison of a polymerization process carried out in the absence of an oxygen-containing gas with a polymerization process carried out in the presence of an oxygen-containing gas shows that in the latter case either a similar increase in the activity of the catalyst composition can be achieved by applying a lower concentration of organic oxidant, or a bigger increase in the activity of the catalyst composition can be achieved by applying the same concentration of organic oxidant. Air is a very suitable oxygen-containing gas.

The polymers according to the invention have good mechanical properties. They can be processed by means of the usual techniques into, among other things, films, sheets, plates, fibers and molded objects. The low molecular weight polymers in particular may be used as intermediates for the production of plastics, as components in blends with other polymers (such as waxes and greases) and as plasticizers for other polymers. The higher molecular weight polymers have use and utility as premium thermoplastics for fibers, films, injection molding, compression molding or blowing applications. On account of their properties, the higher molecular weight polymers according to the invention are suitable for many applications, such as in the auto industry, for the manufacture of packaging material for the foods and drinks, as constructional and building material, for the manufacture of cables and for a variety of applications in the domestic sphere. In order to modify the characteristics or to strengthen them, the polymers according to the invention can be employed in combination with many other sorts of materials.

The invention will now be illustrated with the aid of the following examples.

EXAMPLE 1

A carbon monoxide/ethylene copolymer was prepared as follows. Into a magnetically stirred autoclave of 250 ml capacity a catalyst solution was introduced comprising 50 ml methanol, 0.1 mmol palladium acetate, 3 mmol 2,2'-bipyridine and 2 mmol para-toluenesulfonic acid. Carbon monoxide was introduced into the autoclave under pressure until a pressure of 20 bar was reached, followed by ethylene until a pressure of 60 bar was reached. Finally, the contents of the autoclave were heated to 100° C. After 5 hours the polymerization was stopped by cooling the reaction mixture down to room temperature and then releasing the pressure. The polymer was filtered off, washed with methanol and dried in vacuo at room temperature. The result was 1.5 g of copolymer.

EXAMPLE 2

A carbon monoxide/ethylene copolymer was prepared in substantially the same way as the copolymer of Example 1, except for the following differences:
(a) the catalyst solution contained 40 mmol 1,4-benzoquinone, and
(b) the reaction time was ¼ hour.

The result was 17.1 g of copolymer.

EXAMPLE 3

A carbon monoxide/ethylene copolymer was prepared in substantially the same way as the copolymer of Example 1, except for the following differences:
(a) the catalyst solution contained 70 mmol nitrobenzene,
(b) the reaction time was 3 hours, and
(c) the reaction temperature was 125° C.

The result was 10.0 g of copolymer.

EXAMPLE 4

A carbon monoxide/ethylene copolymer was prepared in substantially the same way as the copolymer of Example 1, except for the following differences:
(a) the catalyst solution contained 10 mmol butyl nitrite
(b) the reaction time was 1 hour, and
(c) the reaction temperature was 125° C., The result was 11.5 g of copolymer.

EXAMPLE 5

A carbon monoxide/ethylene copolymer was prepared in substantially the same way as the copolymer of Example 1, except for the following differences:
(a) the catalyst solution contained
50 ml methanol,
0.1 mmol palladium acetate,
2 mmol 2,2'-bipyridine,
2 mmol copper para-tosylate, and
20 mmol 1,4-benzoquinone,
(b) carbon monoxide was introduced into the autocalve until a pressure of 30 bar was reached, followed by ethylene until a pressure of 60 bar was reached.
(c) the reaction time was 16 hours, and
(d) the reaction temperature was 20° C.

The result was 13.0 g of copolymer.

EXAMPLE 6

A carbon monoxide/styrene copolymer was prepared as follows.

Into a magnetically stirred autoclave of 250 ml capacity a catalyst solution was introduced comprising 10 ml methanol, 0.1 mmol palladium acetate, 3 mmol 2,2'-bipyridine, 2 mmol para-toluenesulfonic acid and 10 mmol 1,4-benzoquinone. 50 ml styrene was introduced into the autocalve and subsequently carbon monoxide was introduced under pressure until a pressure of 40 bar was reached. Finally, the contents of the autoclave were heated to 70° C. After 5 hours the polymerization was stopped and the polymer was isolated as indicated in Example 1.

The result was 24.0 g of copolymer.

EXAMPLE 7

A carbon monoxide/styrene copolymer was prepared in substantially the same way as the copolymer of Example 6, except for the following differences:
(a) a catalyst solution contained 3 mmol 1,10-phenanthroline instead of 3 mmol 2,2'-bipyridine and 50 ml methanol instead of 10 ml, and
(b) 10 ml of styrene instead of 50 ml was introduced into the autoclave.

The result was 1.5 g of copolymer.

EXAMPLE 8

A carbon monoxide/styrene/ethylene terpolymer was prepared in substantially the same way as the copolymer of Example 6, except that now ethylene was also introduced into the autoclave in such a quantity as to raise the pressure by 5 bar; this was repeated after one and after two hours.

The result was 28.5 g of terpolymer.

EXAMPLE 9

A carbon monoxide/styrene/p-ethylstyrene terpolymer was prepared in substantially the same way as the copolymer of Example 6, except that now also 10 ml of p-ethylstyrene was introduced into the autoclave.

The result was 18.5 g of terpolymer.

EXAMPLE 10

A carbon monoxide/styrene copolymer was prepared in substantially the same way as the copolymer of Example 6, the difference being that now the catalyst solution contained 10 mmol of tetrachloro-1,4-benzoquinone instead of 1,4-benzoquinone.

The result was 21 g of copolymer.

EXAMPLE 11

A carbon monoxide/styrene/n-hexene-1 terpolymer was prepared in substantially the same way as the copolymer of Example 6, the difference being that now also 10 ml of 1-hexene was introduced into the autoclave.

The result was 12 g of terpolymer.

EXAMPLE 12

A carbon monoxide/styrene copolymer was prepared in substantially the same way as the copolymer of Example 6, except for the following differences:
(a) the catalyst solution contained 2 mmol of copper para-tosylate instead of 2 mmol of para-toluenesulfonic acid, and
(b) the reaction time was 1 hour.

The result was 20 g of copolymer.

EXAMPLE 13

A carbon monoxide/styrene copolymer was prepared in substantially the same way as the copolymer of Example 6, except for the following differences:
(a) the catalyst solution contained 2 mmol of iron sulfate instead of 2 mmol of para-toluenesulfonic acid, and
(b) the reaction temperature was 100° C.

The result was 6 g of copolymer.

EXAMPLE 14

A carbon monoxide/styrene copolymer was prepared in substantially the same way as the copolymer of Example 6, except that in this case 0.25 mmol instead of 2 mmol of para-toluenesulfonic acid was used.

The result was 24.5 g of copolymer.

EXAMPLE 15

A carbon monoxide/styrene copolymer was prepared in substantially the same way as the copolymer of Example 6, except that in this case use was made of a catalyst solution comprising
10 ml methanol,
0.1 mmol palladium acetate
0.3 mmol 1,10-phenanthroline,
1 mmol para-toluenesulfonic acid, and
20 mmol 1,4-benzoquinone.

The result was 5.7 g of copolymer.

EXAMPLE 16

A carbon monoxide/styrene copolymer was prepared in substantially the same way as the copolymer of Example 6, except for the following differences:
(a) the catalyst solution contained 40 mmol instead of 10 mmol of 1,4-benzoquinone, and
(b) the reaction time was 1 hour, and
(c) the reaction temperature was 90° C.

The result was 22.7 g of copolymer.

EXAMPLE 17

A carbon monoxide/norbornene copolymer was prepared in substantially the same way as the copolymer of Example 6, except for the following differences:
(a) the catalyst solution contained 20 mmol instead of 10 mmol of 1,4-benzoquinone
(b) 30 ml of norbornene was introduced into the autoclave instead of 50 ml of styrene,
(c) the reaction time was 2 hours, and
(d) the reaction temperature was 90° C.

The result was 26 g of copolymer.

EXAMPLE 18

A carbon monoxide/norbornadiene copolymer was prepared in substantially the same way as the copolymer of Example 6, except for the following differences:
(a) the catalyst solution contained 20 mmol instead of 10 mmol of 1,4-benzoquinone
(b) 30 ml of norbornadiene was introduced into the autoclave instead of 50 mol of styrene, and
(c) the reaction temperature was 90° C.

The result was 25 g of copolymer.

EXAMPLE 19

A carbon monoxide/dicyclopentadiene copolymer was prepared in substantially the same way as the copolymer of Example 6, except for the following differences:
(a) the catalyst solution in addition contained 15 ml of tetrahydrofuran,
(b) 50 ml of dicyclopentadiene was introduced into the autoclave instead of 50 ml of styrene,
(c) the reaction time was 16 hours, and
(d) the reaction temperature was 20° C.

The result was 11.5 g of copolymer.

EXAMPLE 20

A carbon monoxide/styrene copolymer was prepared in substantially the same way as the copolymer of Example 6, except that in the present case:
the catalyst solution contained 2 mmol of trifluoroacetic acid instead of 2 mmol of para-toluenesulfonic acid.

The result was 3.5 g of copolymer.

EXAMPLE 21

A carbon monoxide/dicyclopentadiene copolymer was prepared in substantially the same way as the copolymer of Example 6, except for the following differences:
(a) the catalyst solution contained in addition 15 ml of tetrahydrofuran,
(b) 50 ml of dicyclopentadiene was introduced into the autoclave instead of 50 ml of styrene,
(c) carbon monoxide was introduced into the autoclave until a pressure of 30 bar was reached, followed by air until a pressure of 60 bar was reached,
(d) the reaction time was 16 hours, and
(e) the reaction temperature was 20° C.

The result was 17 g of copolymer.

EXAMPLE 22

A carbon monoxide/styrene copolymer was prepared in substantially the same way as the copolymer of Example 6, except for the following differences:
(a) carbon monoxide was introduced into the autoclave until a pressure of 30 bar was reached, followed by air until a pressure of 50 bar was reached, and
(b) the reaction time was 3 hours.

The result was 25 g of copolymer.

EXAMPLE 23

A carbon monoxide/ethylene copolymer was prepared in substantially the same way as the copolymer of Example 1, except for the following differences:
(a) the catalyst solution contained 0.5 mmol of copper para-tosylate instead of 2 mmol of para-toluenesulfonic acid and, in addition, 1 ml of ditert-butyl peroxide,
(b) carbon monoxide was introduced into the autoclave until a pressure of 30 bar, instead of 20 bar, was reached,
(c) the reaction temperature was 80° C., and
(d) the reaction time was 1 hour.

The result was 2.2 g of copolymer.

With the aid of $^{13}$C—NMR analysis it was established that the copolymers and terpolymers prepared according to Examples 1-23 had an alternating structure, which means that carbonyl groups and hydrocarbon groups occur in the polymer chains in alternating order. With the aid of $^{13}$C—NMR analysis it was further established that the polymers prepared according to Examples 1-17 and 19-23 had a linear structure.

The average molecular weight of the CO/styrene copolymers prepared in the Examples was at least about 4000, and generally greater than 10,000, as determined via NMR. Based on the analysis of the $^1$H—NMR and the $^{13}$C—NMR spectra, the copolymers have an alternating CO/styrene structure with a styrene-head-to-tail sequence and ester

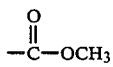

end groups.

Of Examples 1–23, Examples 2–23 are examples according to the invention. Example 1 falls outside the scope of the invention and has been included in the patent application for comparison.

Comparison of the results of Examples 1 and 2 clearly demonstrates the increase in activity obtained by the inclusion of a component 4, an organic oxidant, in a catalyst composition according to the invention. In Example 1, where the catalyst composition contained no organic oxidant, the result after a reaction time of 5 hours was no more than 1.5 g of copolymer, whereas in Example 2, where the catalyst composition did contain an organic oxidant, the result after no more than ¼ hour was already 17.1 g of copolymer. The increase in the activity of the catalyst compositions by the insertion of an organic oxidant is also seen from comparison of the results of Example 1 with those of Examples 3, 4 and 23 where, insteads of 1,4-benzoquinone, the organic oxidants used were nitrobenzene, butyl nitrite and ditert-butyl peroxide, respectively.

The favorable effect of the presence of air during the polymerization is clearly demonstrated by comparison of the results of Examples 19 and 21. In Example 19, carried out in the absence of air, 11.5 g of copolymer was produced, whereas the copolymer yield in Example 21, which was carried out in the presence of air, was 17 g. The favorable influence of the presence of air during the polymerization is also made clear by comparison of the results of Examples 6 and 22. In Example 6, carried out in the absence of air, the result after a reaction time of 5 hours was 24 g of copolymer, whereas the copolymer yield in Example 22, carried out in the presence of air, was 25 g after a reaction time of no more than 3 hours.

What is claimed is:

1. A catalyst composition which comprises
   (1) a compound of a Group VIII metal selected from the group consisting of palladium, cobalt and nickel, said compound being a salt of a carboxylic acid,
   (2) a metal salt having an anion of a non-hydrohalogenic acid with a pKa less than 6, wherein the metal is selected from the group consisting of nickel, copper, iron, cobalt, chromium, manganese and vanadium,
   (3) a nitrogen bidentate ligand of the general formula

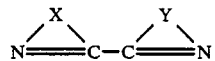

wherein X and Y represent similar or different organic bridging groups, each bridging group having a bridge containing three or four atoms, wherein at least two of the atoms in the bridge are carbon atoms, and
   (4) an organic oxidant selected from the group consisting of unsubstituted 1,4-benzoquinones, 1,4-benzoquinones substituted with one or more groups selected from chloro, methyl, hydroxy or nitro groups, alkyl nitrites, and aromatic nitro compounds, said aromatic nitro compounds being selected from nitrobenzene, nitrotoluene or nitrochlorobenzene.

2. The composition of claim 1 wherein the Group VIII metal is palladium.

3. The composition of claim 2 wherein the palladium compound is palladium acetate.

4. The composition of claim 2 wherein the anion of an acid having a pKa less than 6 is an anion of an acid selected from the group consisting of sulfonic acids having a pKa of less than 6 and carboxylic acids having a pKa of less than 6.

5. The composition of claim 2 wherein the anion of an acid having a pKa less than 6 is an anion of an acid selected from the group consisting of sulfonic acids having a pKa of less than 2 and carboxylic acids having a pKa of less than 2.

6. The composition of claim 2 wherein the anion of an acid having a pKa of less than 6 is an anion of an acid selected from the group consisting of para-toluenesulfonic acid and trifluoroacetic acid.

7. The composition of claim 5 wherein the metal salt is the salt of a metal selected from the group of metals consisting of nickel, copper, iron, and vanadium.

8. The composition of claim 5 wherein the organic bridging groups X and Y also contain nitrogen atoms.

9. The composition of claim 5 wherein the organic bridging groups X and Y are the same.

10. The composition of claim 5 wherein the nitrogen bidentate ligand is selected from the group consisting of unsubstituted 2,2'bipyridine, 2,2' bipyridine substituted with one or more groups selected from methyl, chloro, methoxy or carboxy groups, unsubstituted 1,10-phenanthroline, and 1,10-phenanthroline substituted with one or more groups selected from chloro, phenyl or methyl groups.

11. The composition of claim 10 wherein the organic oxidant is selected from the group consisting of 1,4-benzoquinone, and substituted 1,4-benzoquinone.

* * * * *